United States Patent [19]

Grassin et al.

[11] 4,150,874
[45] Apr. 24, 1979

[54] MIRROR MOUNTING

[75] Inventors: Jerome Grassin, Vanves; Maurice Thouvenin, Parmain; Jean-Claude Épié, Montmorency, all of France

[73] Assignee: Saint-Gobain Industries, Neuilly-sur-Seine, France

[21] Appl. No.: 776,613

[22] Filed: Mar. 11, 1977

[30] Foreign Application Priority Data

Mar. 17, 1976 [FR] France ............................. 76 07756

[51] Int. Cl.² .............................................. G02B 5/10
[52] U.S. Cl. ................................... 350/292; 350/293; 350/320
[58] Field of Search ............... 350/292, 293, 320, 310; 126/270, 271

[56] References Cited

U.S. PATENT DOCUMENTS

| 1,897,364 | 2/1933 | Dietz | 350/292 X |
| 1,951,404 | 3/1934 | Goddard | 350/292 X |
| 2,707,903 | 5/1955 | Trombe | 350/292 |
| 2,968,033 | 1/1961 | Kreitzberg | 350/292 X |
| 2,987,961 | 6/1961 | Cotton et al. | 350/292 |
| 3,977,773 | 8/1976 | Hubbard | 352/292 |

Primary Examiner—F. L. Evans
Attorney, Agent, or Firm—Pennie & Edmonds

[57] ABSTRACT

A mirror mounting is described in which a plane rectangular reflecting strip is deformed along the two longer edges thereof so that it is approximately tangent to the ideal mirror while the strip remains substantially flat in the direction of its shorter edges. In the preferred embodiment of the invention, a plurality of such reflecting strips are so formed by attachment to a supporting frame using a pair of elastomeric cushion frames to embrace the longer sides of each strip while leaving the shorter sides free. Advantageously, each reflecting strip on the frame is bent in a continuous manner the full distance of its longer side. The frame is preferably a rigid array of parallel channel members each of which is adapted to receive a curved T-section angle bar having the desired curvature of the reflecting strip. The angle bars are deformed into this curvature in a separate operation while they are being attached to the channel members. Specific apparatus for deforming the reflecting strips into conformity with the curved angle bars and for attaching the strips to the cushion frames is also described.

6 Claims, 10 Drawing Figures

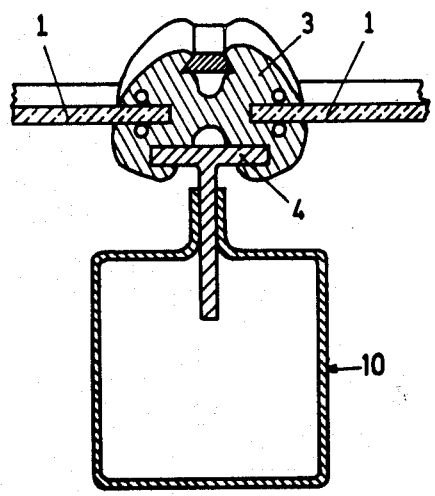
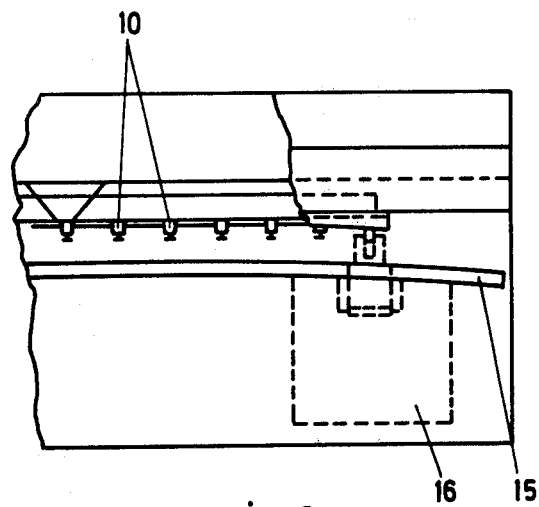
Fig. 4
Fig. 6
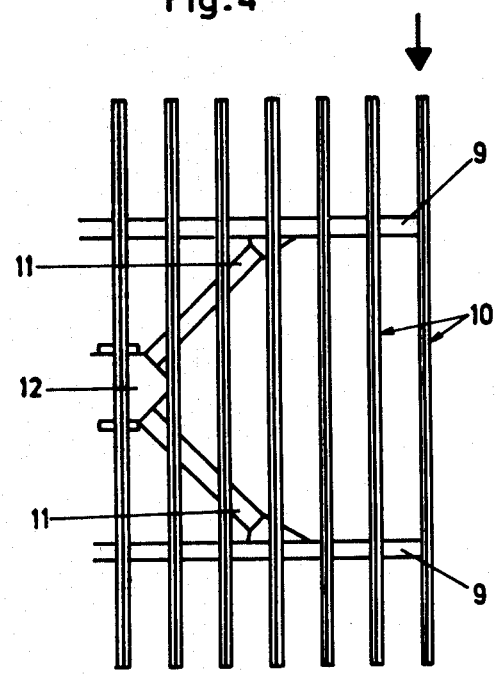
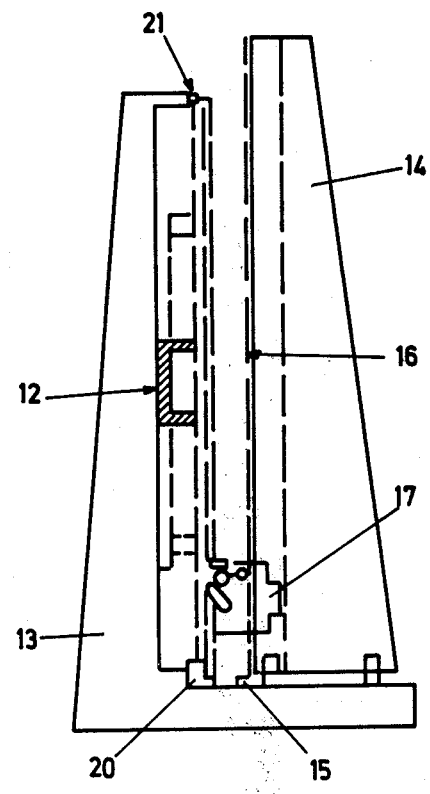
Fig. 5
Fig. 7
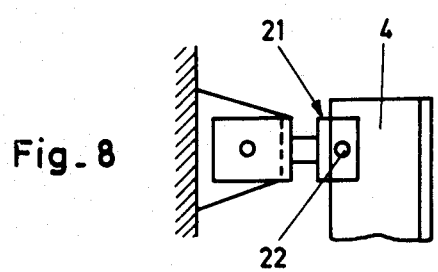
Fig. 8

MIRROR MOUNTING

BACKGROUND OF THE INVENTION

This invention relates to a method for mounting mirrors such as those which might be used in a solar power plant.

Solar power plants typically comprise a large number of mirrors arranged to reflect solar radiation into a boiler placed at the center of the mirror field on top of a tower. This boiler feeds steam to a turbine located at the foot of the tower to drive an electric generator. Since the position of each mirror must be changed periodically to direct reflected sunlight onto the boiler, the mirrors are mounted on orientators which automatically adjust their position at regular intervals. By way of example a 15 MW solar power plant can comprise 1250 mirrors, each having an area of 50 square meters, and a boiler located on top of a tower 150 meters in height. The mirrors are arranged in 20 concentric semicircles having radii from 100 to 500 meters and centered on a point directly beneath the boiler. To form a focused light spot that is smaller than the boiler the shape of the mirrors must approximate that of a spherical mirror with a large radius. In the above example this radius would range from 360 to 1000 meters, depending on the distance from the mirror to the boiler.

The mirrors used in solar power plants are designed with the following considerations:

they should be relatively inexpensive, so that the solar power plant will be competitive with conventional electric power plants;

they should be reliable so as to limit replacement, maintenance and adjustment costs;

they should retain a shape close to that of the ideal convergent mirror in spite of deformations due to the wind, to heat and to their own weight;

they should have a relatively small weight to simplify the design of the orientators.

To comply with these conditions, mirrors have been designed either with a single curved glass face or with a plurality of plane glass faces which are silvered on one side to provide a reflecting surface. Typically, the back side of the glass is silvered so that the glass seals and protects the reflecting surface from the weather.

To form a single curved glass face, the glass must be cast onto an appropriate form or a hot sheet of glass must be curved by applying it to a form. Since these approaches require polishing of the glass after curving, they are generally too expensive.

In the case of mirrors having a plurality of plane glass faces, square or hexagonal mirror components are set onto supports such that each facet formed by one of these components will be tangent at its center to the ideal mirror. A good approximation to the ideal mirror can thus be obtained provided a very large number of plane components are used. However, the shaping of the components is expensive; and each component must be protected against the weather over its entire periphery to prevent loosening of the silver layer from the glass. In addition, the positioning of each component is costly and must be adjusted periodically; and since it is necessary to provide a large number of bearing points on the mirror supports, the structure is relatively heavy and requires the use of fairly complex orientators.

Alternatively, it is possible to deform plane glass face components to give them an approximately spherical shape by positioning their periphery on bearings which coincide with the ideal mirror and pulling on their center. While it is theoretically possible to make mirrors having deformed glass face components that are larger than mirrors with plane faces, even stronger bearings must be used to limit the flexure of the glass face under wind pressure and its own weight. In addition to the other drawbacks of multi-component mirrors, it is also necessary to paste an anchor onto the rear silvered face of each component or to make a hole in it so as to exert a pulling action during deformation. This, however, increases the risk of breakage during use, and makes it necessary to provide thermal treatment to the glass face to limit such risks.

Typical mirror constructions of the prior art are disclosed in such patents as U.S. Pat. Nos. 1,951,404 and 3,884,217 and French Pat. Nos. 447,329, 1,035,832 and 1,238,883.

SUMMARY OF THE INVENTION

To minimize the drawbacks of the prior art, we have devised a mirror mounting in which a plane rectangular reflecting strip is deformed along the two longer edges thereof so that it is approximately tangent to the ideal mirror while the strip remains substantially flat in the direction of its shorter edges. In the preferred embodiment of the invention, a plurality of such reflecting strips are so formed by attachment to a supporting frame using a pair of elastomeric cushion frames to embrace the longer sides of each strip while leaving the shorter sides free. Advantageously, each reflecting strip on the frame is bent in a continuous manner the full distance of its longer side.

The frame is preferably a rigid array of parallel channel members each of which is adapted to receive a curved T-section angle bar having the desired curvature of the reflecting strip. The angle bars are deformed into this curvature in a separate operation while they are being attached to the channel members.

Specific apparatus for deforming the reflecting strips into conformity with the curved angle bars and for attaching the strips to the cushion frames has also been invented.

BRIEF DESCRIPTION OF THE DRAWING

These and other objects, features and elements of the invention will be apparent from detailed description of the drawing in which:

FIG. 4 is a sectional view similar to that of FIG. 2 but showing details of an illustrative embodiment of the frame on which the mirror is mounted;

FIG. 5 is a partial schematic plan view of an illustrative embodiment of the frame of a mirror according to the invention;

FIG. 6 is a top view of this frame along arrow F of FIG. 5, with the frame mounted in apparatus for making a portion of the frame;

FIG. 7 is a schematic side elevational view of such apparatus;

FIG. 8 is a view in a larger scale of a detail of the apparatus of FIG. 7;

DETAILED DESCRIPTION OF THE DRAWING

Figure 1:
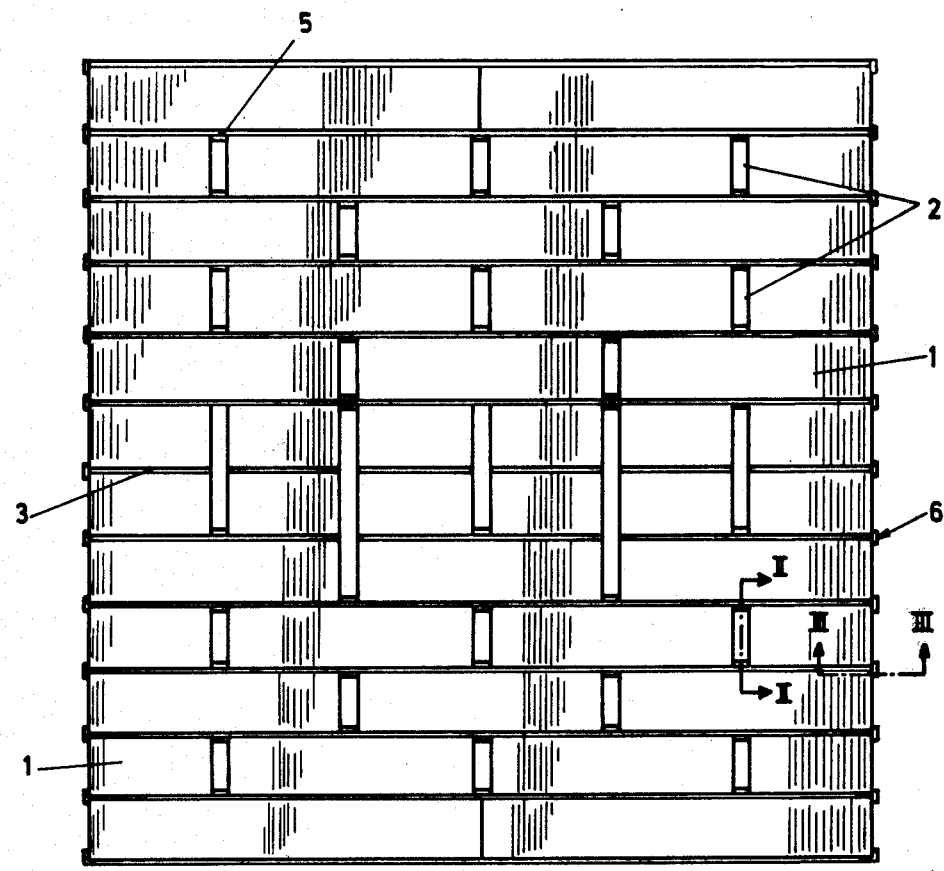
FIG. 1 is a schematic front view of an illustrative embodiment of a mirror according to the present invention.

The mirror shown in FIG. 1 comprises curved reflecting components 1, carried by a frame not shown in this Figure. These components are shaped and positioned to approximate an ideal convergent mirror, such as a spherical mirror, that is continuously curved in both its horizontal and vertical dimensions. However, reflecting components 1 are curved only in the direction of their longer dimension (the horizontal direction in FIG. 1) and are flat in the direction perpendicular thereto. The curvature of the reflecting component is such that the compounds are tangent to the ideal convergent mirror along a line that extends the length of their longer dimension. Since the ideal mirror is also curved in the vertical direction, the flat surfaces of vertically adjacent reflecting components are mounted at an angle of less than 180 degrees to one another to approximate the curvature of the ideal mirror in that direction.

Intervals 2 separate the short sides of some of these components to form openings in the mirror which are designed to let the wind go through and to thus limit the formation of vortices behind the mirror. A cross-piece 5 having a length equal to the spacing between two components, for example, 15 centimeters, is used to maintain the desired opening between components.

Figure 3:
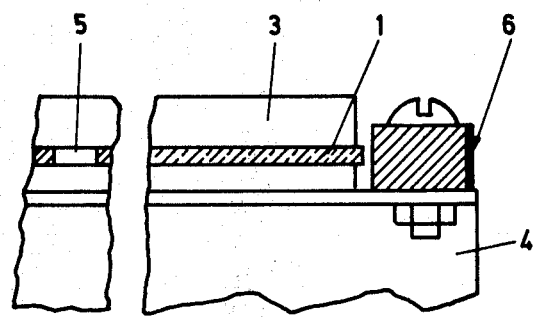
FIG. 3 is a sectional view of the end part of said mirror along line III—III of FIG. 1.
Figure 2:
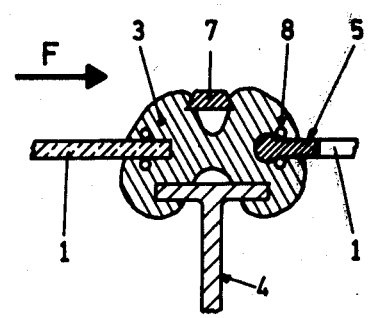
FIG. 2 is a sectional view of a portion of said mirror along line II—II of FIG. 1.
Figure 9:
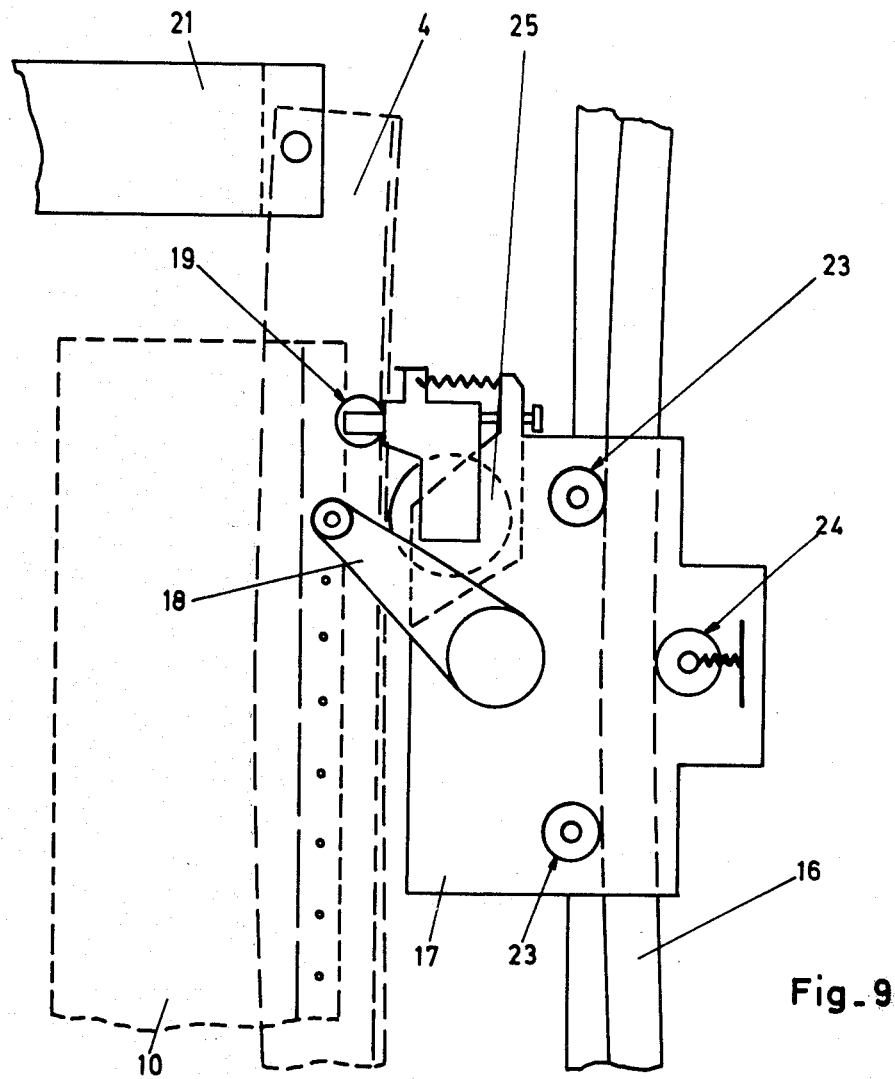
FIG. 9 is a schematic side elevational view of an illustrative embodiment of a movable shaping and welding member of the apparatus of FIG. 7.
Figure 10:
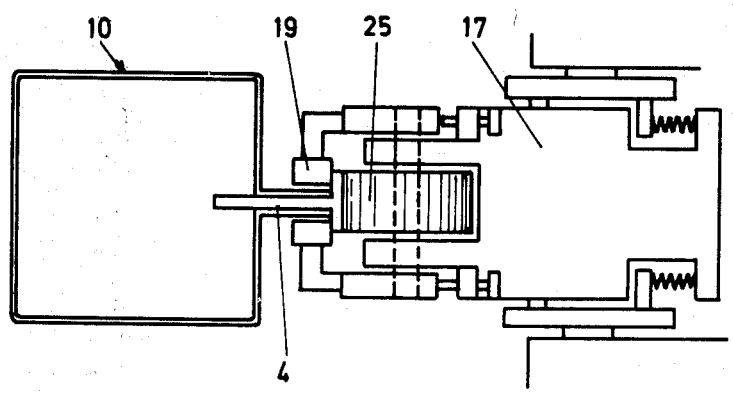
FIG. 10 is a top view of this shaping and welding member.

Each component is formed by attaching the longer diameter of a plane rectangular reflecting strip to a pair of adjacent curved T section angle bars 4 by means of elastomeric cushion frames 3, shown in FIGS. 2-4. Cushion frames 3 are strong enough to bend the longer dimension of a reflecting strip about an axis perpendicular to that dimension so that the longer dimension of a strip assumes substantially the same curvature as that of the angle bars to which this strip is attached. As will be described below in greater detail, each angle bar is curved in accordance with the shape of the ideal mirror so that the topside of the T section is approximately tangent to the ideal mirror. Adjacent angle bars are located at different heights as will be explained below but are substantially parallel to one another. As a result, a strip that is connected between adjacent angle bars remain substantially flat in the direction of its shorter dimension and is shaped like a portion of a cylinder. Key 7 firmly tightens joints 8 onto reflecting components 1, thereby securing reflecting components 1 in a correct position and protecting their edges against the weather. Key 7 can be easily removed in order to replace a damaged component. Plastic thrust bearings 6 attached to the end parts of angle bars 4 prevent the reflecting components from sliding in the cushion frames.

The angle bars are positioned at different heights relative to one another so that the flat surfaces of the reflecting strip extending between adjacent angle bars approximate the curvature of the ideal mirror in the direction perpendicular to the longitudinal axis of the angle bar. Thus, the curvature of the angle bars in one direction and their position in the perpendicular direction approximate the curvature of the ideal mirror in these two directions.

The use of elastomeric cushion frames to secure the long sides of the reflecting components is a reliable and simple means of attachment which does not lead to any stress concentration within a reflecting component and, therefore, does not create any risk of breakage of the component during use. As a result, the reflecting components can be made simply by deforming ordinary plane glass faces in a single direction to conform to the curvature of the T shaped angle bar when the glass faces are set into place on the cushion frames. The strains imparted to the glass are weaker than those produced upon spherical flexure; and it is not necessary to use the anchors of the prior art, to make holes in the glass face, or to provide thermal treatment to relieve strains.

If desired, the invention may also be practiced using reflecting components of other materials. For example, glass can be completely or partially replaced with a plastic material, or the components can also be made of a polished metal sheet protected with a transparent coating.

An illustrative mirror assembled according to the invention comprises twenty-four reflecting glass components each having dimensions of 0.6 meters (m.) × 3.6 meters × 6 millimeters (mm.). These reflecting components are coupled in pairs through their shorter sides to form twelve cylindrical mirror strips of 0.6 m. × 7.2 m. These strips are mounted throughout their longer sides to 13 parallel cushion frames approximately 7.2 m. long spaced 0.6 m. apart to form a mirror that is 7.2 m. × 7.2 m. The cushion frames, in turn, are mounted on curved T section angle bars that are approximately tangent to the ideal mirror. It will be recognized that reflecting strps of these dimensions are quite large, a factor which contributes to the economy of this mirror design. An added advantage is that the cushion frames along the two longer sides of each reflecting component protect most of the periphery of the strip from the weather. For the application in which this mirror is used, the 0.6 m. spacing between cushion frames is the maximum practical spacing. For larger spacings, deformation in the glass face due to wind and gravity lower the efficiency of the power plant to the point where it is uneconomical.

The mirror support frame is shown in FIG. 5. It comprises two parallel beams 9 which are supported by arms 11 of a fastening unit 12 that is secured to the orientator. Several parallel joists 10 are welded to beams 9 at right angles thereto. The T shaped angle bars 4 are mounted in these joists.

Joists 10 illustratively are made of folded sheet metal and have a cross-section such as that shown in FIG. 4. Such a configuration has been found to be strong enough to hold the curved angle bars at the proper curvature and to resist wind pressure and the weight of the mirror without undergoing undue deformation. In addition, this configuration also facilitates the placement of angle bars 4 between the joist lips and their welding thereto as will be described below.

It will thus be seen that the frame of the mirror comprises an array of spaced-apart substantially parallel support members in the form of angle bars 4 (or other support means) which are curved to conform generally to the contour of a continuously curved mirror. The longer sides of plane rectangular strips are attached between pairs of these supporting members and are deformed by appropriate attachment means to conform in the direction of their longer dimension to the curvature of angle bars 4. In the direction of their shorter dimension the reflecting strips are substantially flat. Since the mirror is shaped to approximate the curvature of an ideal mirror which is curved in two dimensions, the T-shaped angle bars 4 are positioned at varying heights from parallel beams 9 so that a line connecting the top side of each T-shaped angle bar approximates the curvature of the ideal mirror in that direction as well. Preferably, each of the angle bars is curved so that it is approximately tangent to the ideal mirror; and the rectangular reflecting strip mounted between a pair of angle bars is tangent to the ideal mirror along a line that runs the length of the reflecting strip and is equidistant between its longer sides.

Numerous techniques are available for mounting the mirror on its support frame. One method is to permanently deform each of the mirror bearing components prior to its attachment to the support frame. Thus the T shaped angle bars could conceivably first be deformed to approximate the shape of the ideal mirror and then attached to joists 10. This, however, is a relatively complicated and expensive process. We have found that it is more advantageous to perform in a single operation the tasks of bending the angle bars and attaching them to joist 10. To this end we use angle bars having a thin enough section that they can be elastically deformed with only limited effort. As the bars are deformed they are welded to the joists. Apparatus for doing this is shown in FIGS. 6-10.

The apparatus comprises a stationary structure 13, onto which is attached the mirror frame shown in FIG. 5, and a mobile structure 14, which may move in relation to the stationary structure 13 along a curved horizontal track 15. Illustratively the mirror frame is mounted on structure 12 so that joists 10 are in a vertical direction as shown in the top view of FIG. 6. As shown in detail in FIGS. 9 and 10, a carriage 17 is mounted in structure 14 on a curved vertical track 16 so that carriage 17 may move in a vertical direction. The curvature of tracks 15, 16 conforms substantially to the curvature of the ideal mirror in the two perpendicular directions in which they extend. Carriage 17 carries a tack welding device, the arms of which appear at 18 in these Figures, a deflection roller 25 and spring rollers 19 for positioning angle bars 4 on joists 10, and guide rollers 23 and counter-rollers 24 for moving along track 16.

In operating this device an angle bar 4 is inserted between the lips of each joist 10 and its end are inserted in thrust bearings 20, 21 mounted on the stationary structure 12 above and below each one of joists 10. As shown in FIG. 8, each angle bar 4 is held in place on the thrust bearing by a gripper 22 which allows the angle bar to slide toward the other thrust bearing while it is being set into position in joist 10.

Movable structure 14 is then placed in front of the first joist 10 of the mirror frame and an end of the angle bar 4 in that joist is engaged between rollers 19, 25. These rollers maintain the angle bar in the required position in joist 10 so that it may be welded thereto by the tack welder. Since the position of rollers 19, 25 is fixed relative to track 16, the position of an angle bar 4 held in rollers 19, 25 is a function of the contour of track 16. After each weld is made, the carriage 17 is moved along track 16 on which it bears through guide rollers 23 and counter-rollers 24. Since track 16 is parallel to angle bar 10 and is curved to conform substantially to the curvature of the ideal mirror in the direction in which the angle bar extends, rollers 19, 25 will bend the angle bar into substantially conformity with the curvature of the ideal mirror as carriage 17 is moved along track 16; and the tack welder will secure the curved angle bar to joist 10 at each welding point.

When the welding of an angle bar is finished, the mobile structure 14 is brought in front of the following joist and the same cycle of operations is again effected. Since track 15 is curved to conform substantially to the curvature of the ideal mirror in the direction perpendicular to the angle bars, the angle bars in adjacent joists will be located at different depths in the joists. However their contours will be substantially parallel since the same carriage 17 and track 16 are used to form each contour. Thus, when the reflecting components are attached by the cushion frames to the angle bars, each reflecting component remains substantially flat in the direction that is the shortest distance between adjacent angle bars; and the angle between two components that are attached to a common angle bar will be slightly less than 180 degrees so as to approximate the curvature of the ideal mirror in that direction.

Track 16 and carriage 17 can of course be replaced with a plurality of similar tracks and carriages thus making it possible to simultaneously weld several angle bars to their associated joists. If enough tracks and carriages are used to weld all angle bars at once, there will of course be no need for a horizontal track for the displacement of mobile structure 14. In such a case it will also be possible to shape each track 16 to conform more precisely to the curvature of the ideal mirror. Alternatively, the tracks may be individually shaped to correct for aberrations in the mirror or to achieve special effects in the pattern of radiation that is focused onto the boiler.

As will be apparent to those skilled in the art, our invention may be practiced using many variations on what has been described above. In particular, while the invention has been described in terms of the formation of a spherical mirror, it should be understood that it can be used in the fabrication of any type of mirror. Moreover, while all the reflecting components in the preferred embodiment are attached at their edges to adjacent support members, conceivably at least some components could be used that are large enough to be attached to non-adjacent support members and some need not be deformed along their longer dimension to conform to the curvature of the support members. Numerous variations can also be made in the specific apparatus used to form the mirror.

What is claimed is:

1. A mirror comprising a plurality of reflecting components mounted on a frame
    said frame comprising an array of spaced-apart substantially parallel support members, said members being curved to conform generally to the contour of a continuously curved mirror,
    said reflecting components comprising plane rectangular reflecting strips,
    the longer sides of said reflecting strips being attached between pairs of the support members and being deformed by attachment means to conform in the direction of their longer dimension to the curvature of the support members, and
    the shorter sides of said reflecting strips being substantially flat.

2. The mirror of claim 1 in which the length of the rectangular reflecting strip in one direction is approximately equal to the spacing between adjacent support members and the edges of the reflecting strip in the other direction are fastened to the support members by a means which deforms the edges of the reflecting strip into approximately the curvature of the support members.

3. The mirror of claim 2 wherein there are at least three support members in said array and at least one reflecting strip is attached between each pair of adjacent support members and each reflecting strip is substantially flat along the direction that is the shortest distance between adjacent support members.

4. The mirror of claim 3 wherein the support members are positioned in said array so that the reflecting strips conform generally to a contour that is curved continuously in a direction perpendicular to said support members.

5. The mirror of claim 2 in which the means which deforms the edges of the reflecting strip comprises an elastomeric material which is attached to said support member and includes means for mounting on either side of said support member one of said reflecting strips and means for locking said reflecting strips to said elastomeric material.

6. The mirror of claim 1 wherein the reflecting strips comprise a glass sheet having two major surfaces and a reflecting layer adhering to one of said surfaces.

* * * * *

UNITED STATES PATENT AND TRADEMARK OFFICE
CERTIFICATE OF CORRECTION

PATENT NO. : 4,150,874
DATED : April 24, 1979
INVENTOR(S) : Jerome Grassin et al.

It is certified that error appears in the above—identified patent and that said Letters Patent are hereby corrected as shown below:

Column 3, line 17, "component" should be -- components --;

Column 3, line 18, "compounds" should be -- components --;

Column 3, line 34, "diameter" should be -- dimension --;

Column 4, line 34, "strps" should be -- strips --;

Column 4, line 48, "joints" should be -- joists --;

Column 6, line 1, "substantially" should be -- substantial --.

Signed and Sealed this

Tenth Day of July 1979

[SEAL]

Attest:

*Attesting Officer*

LUTRELLE F. PARKER
*Acting Commissioner of Patents and Trademarks*